: US 10,322,692 B2
(45) Date of Patent: Jun. 18, 2019

(54) CONNECTOR AND A RESTRAINT ASSEMBLY IN A VEHICLE

(71) Applicant: Ford Global Technologies, LLC, Dearborn, MI (US)

(72) Inventors: Qingsong Ma, Nanjing (CN); Sophie Yan, Nanjing (CN); Bob Wang, Nanjing (CN); Ivy Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/492,424

(22) Filed: Apr. 20, 2017

(65) Prior Publication Data

US 2017/0305378 A1    Oct. 26, 2017

(30) Foreign Application Priority Data

Apr. 26, 2016   (CN) .......................... 2016 1 0266724

(51) Int. Cl.
*B60R 22/18*  (2006.01)
*B60R 21/213* (2011.01)

(52) U.S. Cl.
CPC ............ *B60R 21/213* (2013.01); *B60R 22/18* (2013.01)

(58) Field of Classification Search
CPC ....... B60R 21/213; B60R 22/18; B60R 22/22; B60R 22/24
See application file for complete search history.

(56) References Cited

U.S. PATENT DOCUMENTS

| 4,103,933 | A | 8/1978 | Fisher | |
|---|---|---|---|---|
| 4,909,541 | A * | 3/1990 | Tokugawa | ............ B60R 22/201 280/801.2 |
| 5,280,959 | A * | 1/1994 | Nanbu | ................. B60R 22/203 280/801.1 |
| 5,415,430 | A | 5/1995 | Valasin | |
| 5,951,046 | A * | 9/1999 | Hosoda | ................. B60R 22/201 280/801.1 |
| 6,224,129 | B1 * | 5/2001 | Cisternino | ........... B60N 2/2806 280/801.1 |
| 7,523,958 | B2 * | 4/2009 | Jang | ...................... B60R 21/213 24/289 |

(Continued)

FOREIGN PATENT DOCUMENTS

| DE | 102004038392 | | 3/2006 | |
|---|---|---|---|---|
| DE | 102004041665 | A1 * | 3/2006 | ............. B60R 22/34 |

(Continued)

*Primary Examiner* — Drew J Brown
(74) *Attorney, Agent, or Firm* — Frank MacKenzie; Kolitch Romano LLP

(57) ABSTRACT

The present disclosure provides a connector to attach an accessory member to a vehicle part. The connector includes a base including an assembling hole and a connecting hole positioned adjacent to a first end of the base to attach the accessory member, a first anchor positioned at a second end portion of the base opposite to the first end portion and a second anchor positioned adjacent to a side of the base between the first end portion and the second end portion. The assembling hole is used to receive a fastener to secure the connector to the vehicle part. The first anchor includes a first locking portion and a second anchor includes a second locking portion to facilitate alignment of the connector with the vehicle part during the assembling.

20 Claims, 6 Drawing Sheets

(56) References Cited

U.S. PATENT DOCUMENTS

| | | | | |
|---|---|---|---|---|
| 9,321,417 | B1* | 4/2016 | Lepper | B60R 21/213 |
| 9,676,359 | B1* | 6/2017 | Arellano | B60R 21/213 |
| 2006/0266897 | A1 | 11/2006 | Beisheim et al. | |
| 2007/0063490 | A1* | 3/2007 | Minamikawa | B60R 21/201 |
| | | | | 280/728.2 |
| 2011/0163521 | A1* | 7/2011 | Gammill | B60R 21/2171 |
| | | | | 280/728.2 |
| 2015/0136919 | A1* | 5/2015 | Kim | B60R 22/22 |
| | | | | 248/201 |
| 2016/0144819 | A1* | 5/2016 | Cho | B60R 21/213 |
| | | | | 280/728.2 |
| 2016/0159308 | A1* | 6/2016 | Choi | B60R 21/213 |
| | | | | 280/728.2 |
| 2017/0247008 | A1* | 8/2017 | Witt, Jr. | B60R 21/213 |

FOREIGN PATENT DOCUMENTS

| | | |
|---|---|---|
| DE | 102007052714 | 5/2009 |
| DE | 102011117002 | 5/2012 |

* cited by examiner

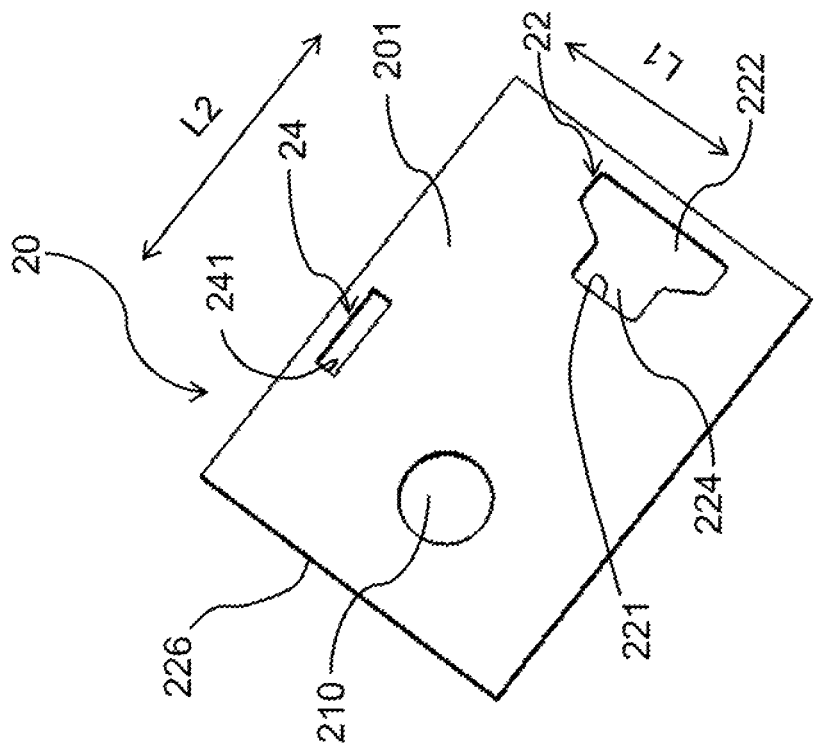
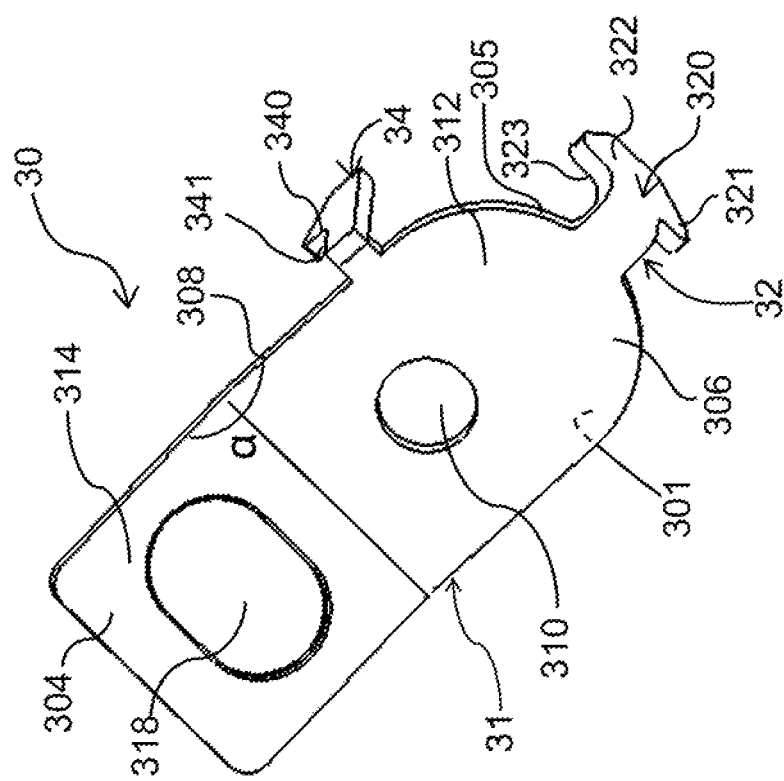
FIG. 3A
FIG. 3B

CONNECTOR AND A RESTRAINT ASSEMBLY IN A VEHICLE

RELATED APPLICATION

This application claims the benefit of Chinese Patent Application No.: CN 201610266724.X filed on Apr. 26, 2016, the entire contents thereof being incorporated herein by reference.

FIELD

The present disclosure relates to a connector and a restraint assembly in a vehicle to improve assembling efficiency.

BACKGROUND

In a vehicle, an accessory member may be attached to a vehicle part to achieve certain functions or for a decoration purpose. For instance, a safety belt may be attached to vehicle floor via a connector. In another example, a side curtain airbag may be attached to a pillar of a vehicle via a connector. The connector generally includes an assembling hole corresponding to an assembling hole of the vehicle part through which a fastener may pass to secure the connector to the vehicle part. At some assembled positions, the connector and the vehicle part may have an angle with a vehicle floor. Thus, it is difficult to align the assembling hole of the connector with the assembling hole of the vehicle part during the assembling process and adjustment is needed to align the assembling holes. The assembling process can be time consuming and has low efficiency.

It is desired to develop a connector to easily align the assembling hole of the connector with the assembling hole of the vehicle part.

SUMMARY

According to one aspect of the present disclosure, a connector to attach an accessory member to a vehicle part is provided. The connector includes a base including an assembling hole and a connecting hole positioned adjacent to a first end portion of the base to attach the accessory member; a first anchor positioned at a second end portion of the base opposite to the first end portion and a second anchor positioned at a side of the base between the first end portion and the second end portion. The first anchor includes a first locking portion; and the second anchor includes a second locking portion at an end portion thereof. The assembling hole is used to receive a fastener to secure the connector to the vehicle part.

In one embodiment, the base includes a first portion and a second portion extending at an angle relative to the first portion. The assembling hole may be positioned on the first portion, and the attachment hole may be positioned on the second portion. The accessory member is a side curtain airbag of a vehicle.

In another embodiment, the first anchor and the second anchor are positioned on the first portion.

In another embodiment, the connector is integrally formed of a metallic material or a material having a strength equivalent to the metallic material.

In another embodiment, the first locking portion includes a pair of locking wings symmetrically positioned at two sides of the first anchor.

In another embodiment, the base further includes an assembling surface, the first anchor and the second anchor extend outwardly from the base in a direction perpendicular to the assembling surface, respectively. The first anchor may be positioned on the second end portion of the base, and the second anchor may be positioned on a side of the base.

In another embodiment, the first anchor and the second anchor contact the vehicle part such that the connector is automatically aligned with the vehicle part.

According to another aspect of the present disclosure, a restraint assembly used in a vehicle is provided. The restraint assembly includes a vehicle part having a first surface and a second surface and a connector. The vehicle part includes a first assembling hole, a first end positioned adjacent to the first assembling hole, a first slot and a second slot spaced apart from the first slot. The connector is used to attach a side curtain airbag to the vehicle part and includes a base having an assembling surface and a second assembling hole, and first and second anchors extending from the base. The first and second anchors may be positioned at the two adjacent sides of the base, and the assembling surface is opposite to the first surface of the vehicle part. The first anchor and the second anchor pass through the first slot and the second slot, respectively when the connector is at a first assembled position. During the movement of the connector from the first assembled position to a second assembled position, the first anchor contacts a wall of the first slot of the vehicle part and the second anchor contacts a wall of the second slot of the vehicle part such that the second assembling hole may be aligned with the first assembling hole.

In one embodiment, the first slot of the vehicle part may include a first cutout and a second cutout, and a width of the second cutout is less than a width of the first cutout.

In another embodiment, the first anchor of the connector may include a first locking portion at an end thereof, and the first locking portion may include a pair of locking wings positioned at two sides of the first anchor, respectively, and the first anchor is received in the second slot at the first and second assembled positions, and an upper surface of the first locking portion is opposite to the second surface of the vehicle part.

In another embodiment, the upper surface of the first locking portion may contact the second surface at the second assembled position.

In another embodiment, the second slot may be substantial a rectangular slot with a width direction being different from a width direction of the first slot.

In another embodiment, the second anchor may include a second locking portion at an end thereof and the second anchor is received in the second slot at a first assembled position, and an upper surface of the second locking portion is opposite to the second surface of the vehicle part.

In another embodiment, the upper surface of the second locking portion may contact the second surface of the vehicle part at the second assembled position.

In another embodiment, the vehicle part is an A-pillar or a rear pillar of a vehicle.

In another embodiment, the base may include a first portion and a second portion extending from the first portion at an angle, the assembling hole may be positioned on the first portion, and the second portion may include a connecting hole to receive a tether of a side curtain airbag.

In another embodiment, the first anchor may be positioned at an end of the first portion opposite to the second portion, and the engagement of the first anchor with the vehicle part prevents the disengagement of the first anchor from the first slot during an assembling process.

In another embodiment, the second anchor may be positioned on the first portion and closer to the second portion relative to the first anchor.

According to yet another aspect of the present disclosure, a restraint assembly in a vehicle is provided to attach a side curtain airbag. The restraint assembly includes a vehicle part having a first surface and a second surface, and a connector. The vehicle part includes a first assembling hole, a first slot and a second slot. The connector includes a base including an assembling face opposed to the first surface of the vehicle part, a connecting hole to receive a tether of the side curtain airbag and a second assembling hole corresponding to the first assembling hole of the vehicle part; a first anchor positioned at a first side of the base opposed to the attachment hole; and a second anchor positioned at a second side of the base adjacent to the first side. The first anchor and the second anchor correspond to the first slot and the second slot of the vehicle part, respectively and contact the first and second slots, respectively such that the first assembling hole may align with the second assembling hole at an assembled position.

In one embodiment, the first anchor and the second anchor extend outwardly from the base and perpendicular to the assembling face. The first anchor includes a first locking portion, and the second anchor includes a second locking portion, and an upper surface of the first locking portion and an upper surface of the second locking portion contact the second surface of the vehicle part.

One or more advantageous features as described herein are believed to be readily apparent from the following detailed description of one or more embodiments when taken in connection with the accompanying drawings.

BRIEF DESCRIPTION OF THE DRAWINGS

FIG. 3A is a perspective view of a connector of the restraint assembly in FIG. 2.

FIG. 3B is a plan view of a vehicle part of the restraint assembly in FIG. 2.

DETAILED DESCRIPTION

Figure 1:
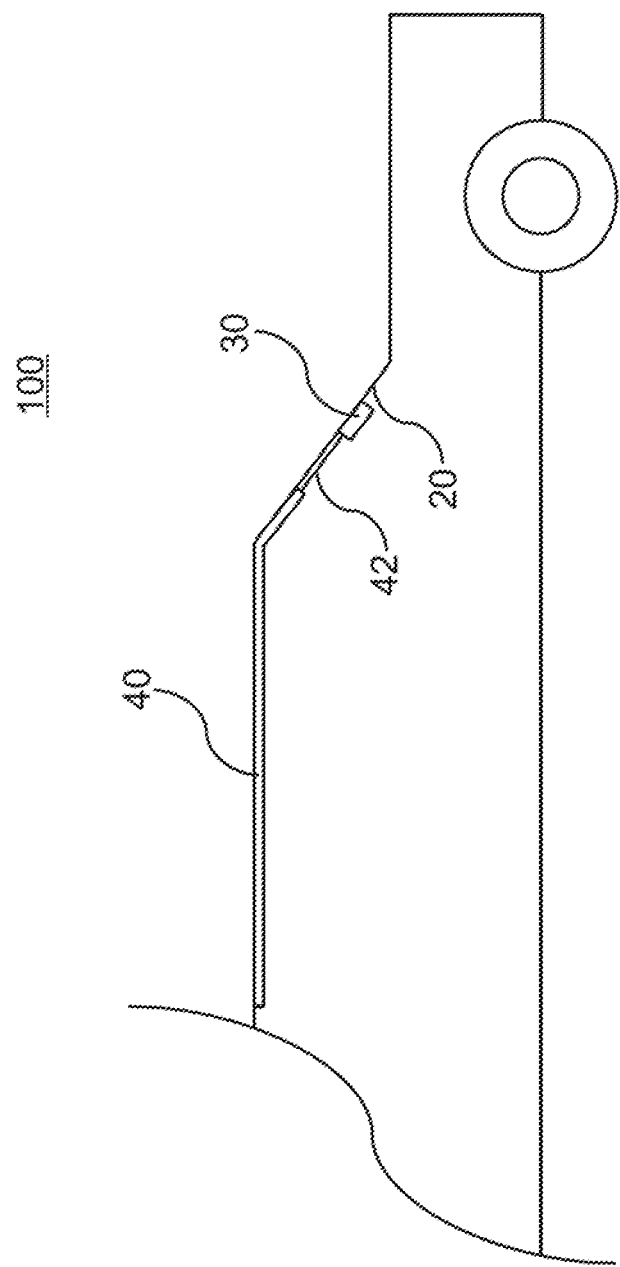
FIG. 1 is a partial view of a vehicle in which a connector according to one or more embodiments of the present disclosure may be implemented.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present disclosure provides a connector and a restraint assembly in a vehicle. The connector includes a base and first and second anchors positioned on the base. The first anchor is positioned at a second end portion of the base opposite to the first end portion. The first anchor includes a first locking portion at an end thereof. The second anchor is positioned at a side of the base between the first end portion and the second end portion and includes a second locking portion at an end portion thereof. The connector or the restraint assembly of the present disclosure enables a quick alignment of the attachment and the vehicle part.

FIG. 1 depicts a partial view of a vehicle 100 in which a restraint assembly according to one or more embodiments of the present disclosure may be implemented. Generally, an accessory member 40 may be attached to a vehicle part 20 via a connector 30 to achieve certain functions or for a decoration purpose. In order to meet high safety requirement, some modern vehicles are equipped with a side curtain airbag. In one or more embodiments as depicted in FIG. 1, the accessory member 40 may be a side curtain airbag 40 positioned along a roof side of the vehicle 100 and attached to the connector 30 via a side curtain airbag tether 42. Further, the connector 30 is fastened to the vehicle part 20. In one or more embodiments, the vehicle part 20 may be a portion of a pillar of a vehicle, such as a front pillar (A-pillar) or a rear pillar (C-pillar or D-pillar). FIG. 1 depicts that the connector 30 is fastened to the A-pillar. However, it will be understood that in other embodiments the vehicle part 20 may also be positioned at other vehicle parts, such as a vehicle floor. Although, the connector 30 is depicted in FIG. 1 to attach the side curtain airbag 40, it may be used to attach other accessory members. For instance, the connector 30 may be used to attach a seat belt to the vehicle floor according to one or more embodiments of the present disclosure.

Figure 2:
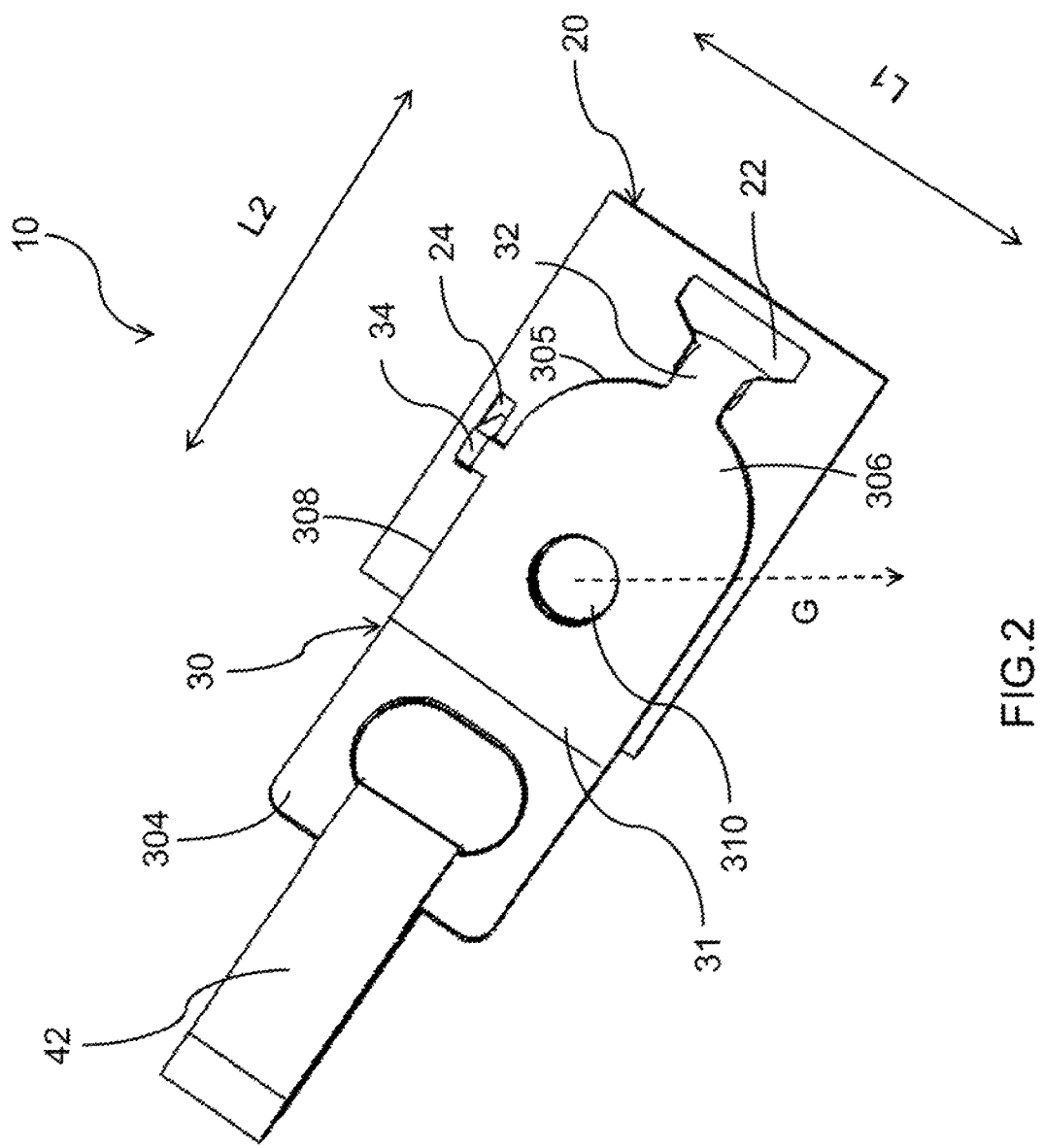
FIG. 2 is a plan view of a restraint assembly at an assembled position according to one embodiment of the present disclosure.
Figure 4:
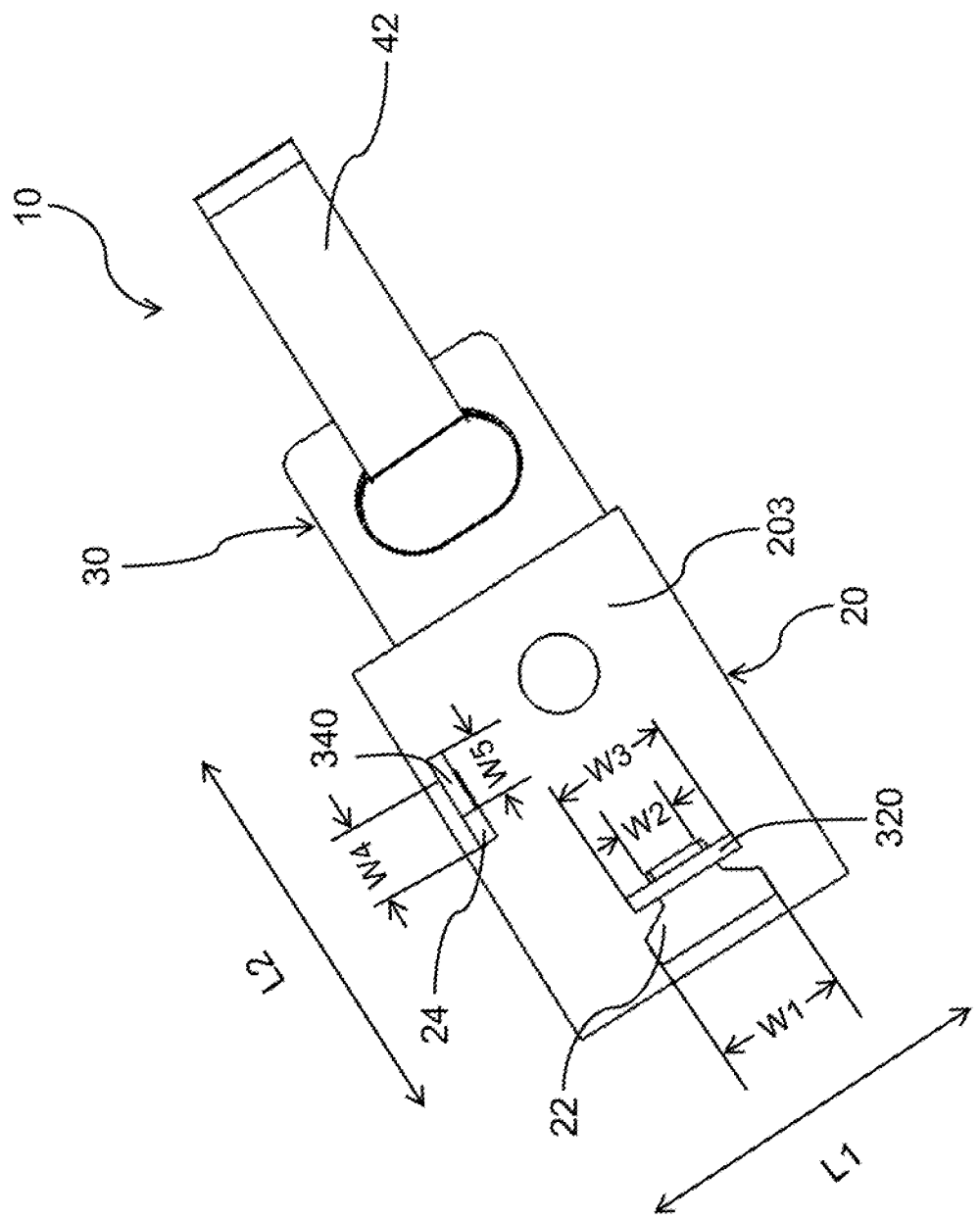
FIG. 4 is a bottom view of the restraint assembly in FIG. 2.

Referring to FIGS. 2, 3A, 3B and 4, FIG. 2 depicts a restraint assembly 10 positioned at an assembled position (i.e., a second assembled position as referred below) according to one embodiment of the present disclosure. FIG. 3A is a perspective view of a connector of the restraint assembly 10 in FIG. 2 and FIG. 3B is a plan view of a vehicle part of the restraint assembly in FIG. 2. FIG. 4 is a bottom view of the restraint assembly 10 in FIG. 2. In one or more embodiments, the restraint assembly 10 includes a vehicle part 20 and a connector 30 fastened to the vehicle part 20 via a fastener.

Referring to FIG. 3B, in one or more embodiments, the vehicle part 20 may be a metal sheet, and include a first surface 201 (shown in FIG. 3B) and a second surface 203 (shown in FIG. 4). Further, the vehicle part 20 includes a first assembling hole 210, a first end portion 226 positioned adjacent to the first assembling hole 210, and first and second slot 22, 24 positioned adjacent to the first assembling hole 210. In one or more embodiments, the first slot 22 includes a substantial T-shaped first cutout 222 and a second cutout 224 connected with the first cutout 222. The second slot 24 may have a rectangular shape and have a width direction L2 different from a width direction L1 of the first slot 22.

FIG. 2 and FIG. 4 depict the connector 30 at an assembled position with the vehicle part 20. Referring to FIG. 4, the direction L1 and L2 are of an angle relative to the gravity direction G, more specifically the direction L1 or the direction L2 are not parallel to the gravity direction G. That is, the restraint assembly 10 is tilted at the assembled position according to one or more embodiments of the present disclosure.

Referring to FIG. 3A, in one or more embodiments, the connector 30 may be integrally formed of metallic material or material having a strength equivalent or comparable to the metallic material, for instance high strength composite materials. The connector 30 includes a base 31 having an assembling surface 301, a first anchor 32 extending outwardly from the base 31 with a first angle to the assembling surface 301, and a second anchor 34 extending outwardly from the base 31 with a second angle to the assembling surface 301. At the assembled position, the assembling surface 301 contacts or is opposite to the first surface 201 of the vehicle part 201. In one or more embodiments, the first angle may be substantial the same as the second angle, and the first anchor 32 and the second anchor 34 may extend outwardly from the base 31 in a direction substantially perpendicular to the assembling surface 301. It will be understood that the term of substantially perpendicular refers to an angle within 90 degrees minus or plus 5 degrees for manufacturing need. In one or more embodiments, the first angle may not be the same as the second angle.

The base 31 may include a second assembling hole 310, a first end portion 304, a second end portion 306 opposed to the first end portion 304, and a connecting hole 318 positioned adjacent to the first end portion 304. The second assembling hole 310 is used to receive a fastener such as a bolt, a rivet to secure the connector 30 to the vehicle part 20. The connecting hole 318 is used to connect with the accessory member 40.

In one or more embodiments, the first anchor 32 is positioned adjacent to the second end portion 306. In one or more embodiments, the first anchor 32 is positioned on the second end portion 306. Further, the first anchor 32 includes a first locking portion 320 at an end thereof. The first locking portion 320 includes an upper surface 323. In one or more embodiments, the upper surface 323 of the first locking portion 320 may be substantial parallel to the assembling surface 301 and the first locking portion 320 may include a pair of locking wings 321, 322 symmetrically positioned at two sides of the first anchor 32. In one or more embodiments, the first locking portion 320 may have only one locking wing. The first locking portion 320 may prevent disengagement of the first anchor 32 from the first slot 22 during an assembling process.

The second anchor 34 is positioned adjacent to a second side 308 of the base 31 between the first end portion 304 and the second end portion 306. In one or more embodiments, the second anchor 34 is positioned at a second side 308 of the base 31 between the first end portion 304 and the second end portion 306. In one or more embodiments, the first anchor 32 and the second anchor 34 may be positioned at adjacent sides of the base 31, that is, the first anchor 32 may be positioned at the first side 305 of the base 31 opposed to the connecting hole 318, while the second anchor 34 may be positioned at the second side 308 of the base 31 adjacent to the first side 305. In one or more embodiments, the second anchor 34 may include a second locking portion 340 at an end thereof, and the second locking portion 340 may include an upper surface 341. In one or more embodiments, the second anchor 34 may be of rectangular and without the second locking portion 340. As depicted in FIG. 3A, the first anchor 32 and the second anchor 34 may be positioned at the same side of the assembling surface 301. The first anchor 32 and the second anchor 34 may correspond to the first slot 22 and the second slot 24 of the vehicle part 20, respectively.

The assembling process according to one or more embodiments of the present disclosure is described with reference to FIG. 2 to FIG. 6. FIG. 6 depicts the restraint assembly 10 at an initial assembled position or a first assembled position. The term of the initial assembled position or the first assembled position in this application refers to the states that the first anchor 32 and the second anchor 34 are inserted into the first slot 22 and the second slot 24, respectively when the connector 30 is assembled onto the vehicle part 20, but the second assembling hole 310 has not aligned with the first assembling hole 210. Further, the first anchor 32 is positioned in a first cutout 222 of the first slot 22. The upper surface 323 of the first locking portion 320 of the first anchor 32 is not directly opposite to the second surface 203 of the vehicle part 20. Further, the upper surface 341 of the second locking portion 340 of the second anchor 34 is not opposite to the second surface 203 of the vehicle part 20. The term "opposite to" in as used here refers to at least partially overlapping in a plane of projection. That is, the projection of the upper surface 323 of the first locking portion 320 of the first anchor 32 in a plane is not overlapped over the second surface 203, and the projection of the upper surface 341 of the second locking portion 340 of the second anchor 34 in a plane is not overlapped over the second surface 203.

Referring back to FIGS. 2, 4-5, FIG. 2, FIGS. 4-5 shows the restraint assembly 10 at an assembled position or the second assembled position according to one or more embodiments of the present disclosure. According to one or more embodiments, the connector 30 may be movable from a first assembled position as shown in FIG. 6 to the second assembled position along the direction L2. The term of an assembled position in this application refers to the location where the connector 30 and the vehicle part 20 are aligned to receive the fastener, and the first anchor 32 and the second anchor 34 contact the vehicle part 20 such that the connector 30 and the vehicle part 20 are aligned automatically. More specifically, the second assembled position is the position when the connector 30 is assembled onto the vehicle part 20, the first anchor 32 and the second anchor 34 are inserted into the first and second slots 22, 24, respectively, and the second assembling hole 310 is aligned with the first assembling hole 210. Further, the first anchor 32 is positioned in the second cutout 224 of the first slot 22.

Further referring to FIGS. 4-5 and FIGS. 3A-3B, when the connector 30 is moved from the first assembled position to the second assembled position, the first anchor 32 is positioned adjacent to or contacts the slot wall 221 of the first slot 22, and the second anchor 34 is positioned adjacent to or contacts the slot wall 241 of the second slot 24 such that the second assembling hole 310 is aligned with the first assembling hole 210. Particularly, the first anchor 32 is positioned in the second cutout 224 and contacts the slot wall 221. Accordingly, even if the restraint assembly 10 is tilted at the assembled position, the second assembling hole 310 will not be offset relative to the first assembling hole 210 under the gravity since the first anchor 32 contacts the slot wall 221 of the first slot 22, and the second anchor 34 contacts the slot wall 241 of the second slot 24 such that the movement of the connector 30 relative to the vehicle part 20 along the direction L1 and the direction L2 may be restricted.

As depicted in FIG. 4, the first cutout 222 of the first slot 22 has a width W1 in the direction L1, while the second cutout 224 has a width W2 in the direction L1, and the first locking portion 320 has a width W3 in the direction L1. In one or more embodiments, the width W3 is greater than the width W2 but less than the width W1. The second slot 24 has a width W4 in the direction L2, and the second locking portion 340 has a width W5 in the direction L2. In one or more embodiments, the width W4 is greater than the width W5. When the connector 30 is moved from the first assembled position to the second assembled position, the first anchor 32 is received in the second cutout 224, and the upper surface 323 of the first locking portion 320 is opposite to the second surface 203 of the vehicle part 20. Further, when the connector 30 is moved from the first assembled position to the second assembled position, the second anchor 34 is received in the second slot 24, and the upper surface 341 of the second locking portion 340 is opposite to the second surface 203 of the vehicle part 20. Another advantage of the restraint system of the present disclosure is that the first locking portion 320 and the second locking portion 340 may restrict the movement of the connector 30 relative to the vehicle part 20 in the direction perpendicular to the assembling surface 301 of the connector 30 at the second assembled position.

Figure 5:
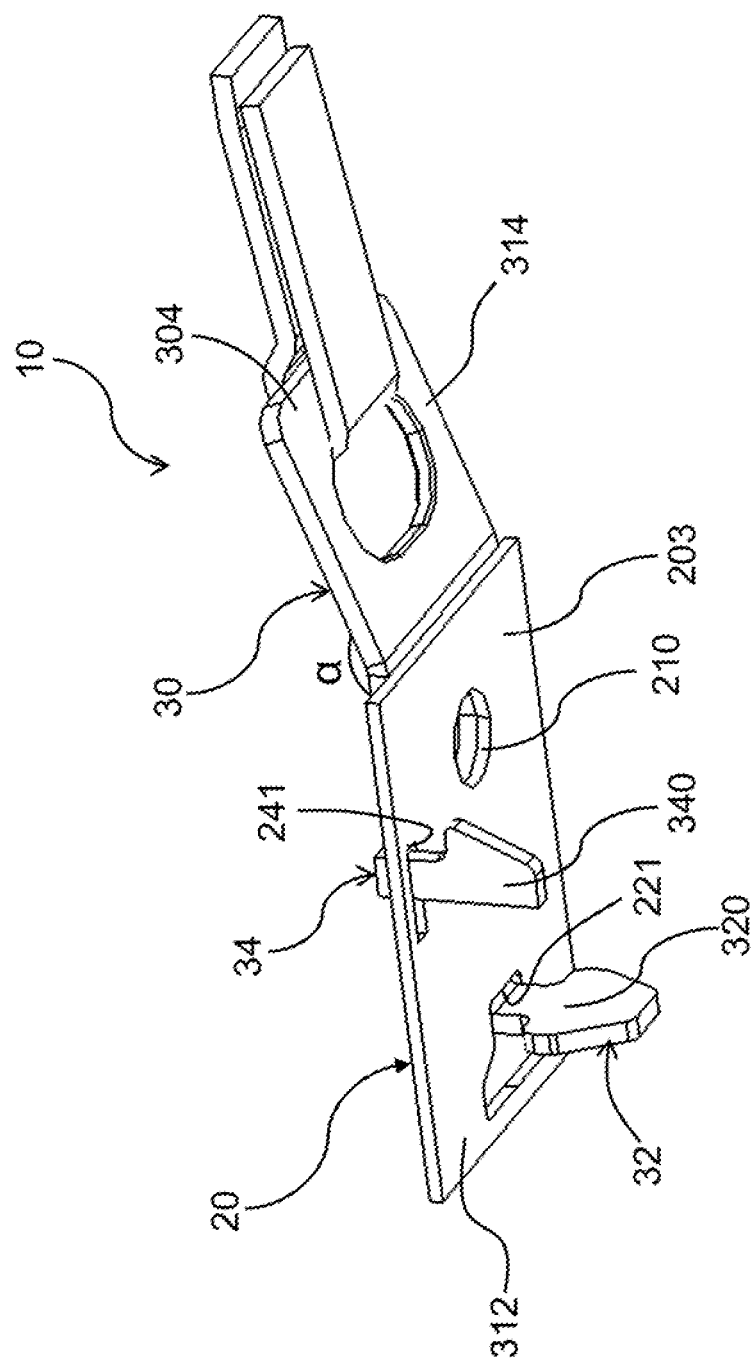
FIG. 5 is a perspective view of the restraint assembly in FIG. 2, illustrating an assembled position.
Figure 6:
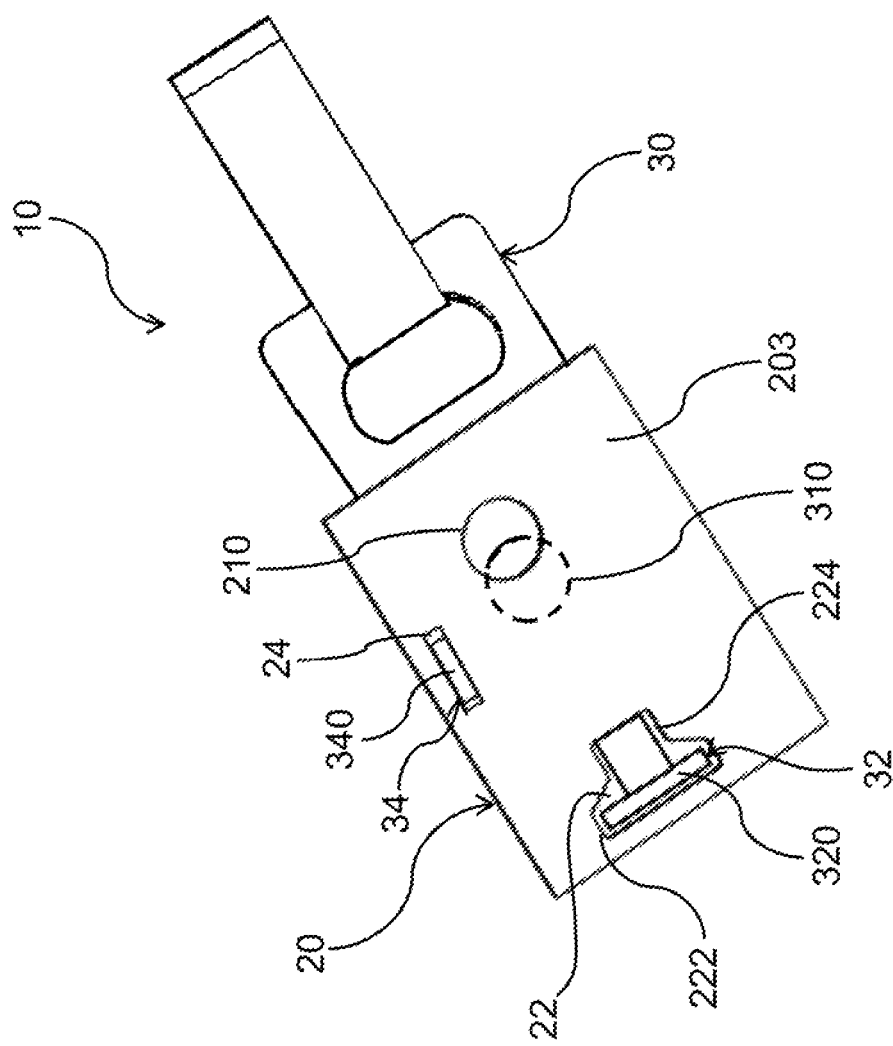
FIG. 6 is a view of the restraint assembly in FIG. 2 at an initial assembled position.

As depicted in FIG. 5, the upper surface 323 of the first locking portion 320 and the upper surface 341 of the second locking portion 340 are spaced at a distance from the second surface 203 of the vehicle part 20, respectively at the second assembled position. It will be understood that based on specific application, the upper surface 323 of the first locking portion 320 and the upper surface 341 of the second locking portion 340 may also be configured to contact the second surface 203 of the vehicle part 20.

In addition, as depicted in FIG. 3 and FIG. 5, in one or more embodiments, the base 31 of the connector 30 may also be configured to include a first portion 312 and a second portion 314 extending from the first portion 312 at an angle relative to the first portion 312. As depicted in FIG. 3, the second assembling hole 310 is positioned on the first portion 312. The connecting hole 318 is configured to receive a tether 42 of the side curtain airbag 40 and is positioned on the second portion 314. The first anchor 32 and the second anchor 34 may be positioned on the first portion 312, and the second anchor 34 is closer to the second portion 318 than the first anchor 32. Since the second portion 314 is positioned at an angle a relative to the first portion 312, if the second portion is experienced pressure, the second end portion 306 of the connector 30 may be deflected away from the first surface 201 of the vehicle part 20 during assembling process. If the second portion 314 is pulled, the first end portion 304 of the connector 30 may be deflected away from the first surface 201 of the vehicle part 20. This deflection may be at least partially mitigated via the configuration of the first anchor 32 and the second anchor 34. More specifically, when the second portion 314 is under a pressure, the first locking portion 34 of the first anchor 32 may inhibit this deflection. When the second portion 314 is pulled by a force, the second anchor 34 may inhibit this deflection. In addition, in the instance that the connector 30 and the vehicle part 20 are at the assembled position and the assembling surface is of an angle relative to the vehicle floor or substantial perpendicular to the vehicle floor, the connector 30 may be fell off due to the gravity during assembling if only the first anchor 32 is present. Therefore, it is not easy to align the second assembling hole 310 with the first assembling hole 210 of the vehicle part 20. While the second anchor 34 may coordinate with the second slot 24 to prevent the connector 30 from moving, and thus the second assembling hole 310 may be automatically aligned with the assembling hole 210 of the vehicle part.

The connector and the restraint assembly of the present disclosure have simple structure and are able to align the connector with the vehicle part easily during the assembly process.

In one or more embodiments, the present invention as set forth herein is believed to have overcome certain challenges associated with the restraint assembly. However, one skilled in the art will readily recognize from such description, and from the accompanying drawings and claims that various changes, modifications and variations can be made therein without departing from the true spirit and fair scope of the invention as defined by the following claims.

The invention claimed is:

1. A connector to attach an accessory member to a vehicle part, comprising:
   a base including an assembling hole and a connecting hole positioned adjacent to a first end portion of the base to attach the accessory member, wherein the assembling hole is used to receive a fastener that secures the connector to the vehicle part;
   a first anchor positioned at a second end portion opposite to the first end portion of the base, the first anchor including a first locking portion; and
   a second anchor positioned at a side of the base, wherein the side is located between the first end portion and the second end portion, and is next to and adjacent the second end portion, and wherein the second anchor includes a second locking portion.

2. The connector of the claim 1, wherein the base includes a first portion and a second portion extending at an angle relative to the first portion, and wherein the assembling hole is positioned on the first portion, wherein the connecting hole is positioned on the second portion, and wherein the accessory member is a side curtain airbag of a vehicle.

3. The connector of the claim 2, wherein the first anchor and the second anchor are positioned on the first portion.

4. The connector of the claim 1, wherein the connector is integrally formed of a metallic material or a material having a strength equivalent to the metallic material.

5. The connector of the claim 1, wherein the first locking portion includes a pair of locking wings symmetrically positioned at two sides of the first anchor.

6. The connector of the claim 1, wherein the base further includes an assembling surface, wherein the first anchor and the second anchor extend outwardly from the base in a direction perpendicular to the assembling surface, respectively.

7. The connector of the claim 1, wherein the first anchor and the second anchor contact the vehicle part such that the connector may be automatically aligned with the vehicle part at an assembled position.

8. A restraint assembly of a vehicle, comprising:
   a vehicle part having a first surface and a second surface, the vehicle part including a first assembling hole, a first slot and a second slot spaced apart from the first slot;
   a connector to attach a side curtain airbag to the vehicle part, the connector including a base having an assembling surface and a second assembling hole, and a first anchor and a second anchor extending from the base away from the assembling surface, wherein the base includes a first side and a second side next to the first side, wherein the first and second anchors are positioned at the first and second sides of the base, respectively, and the assembling surface is opposite to the first surface of the vehicle part;
   wherein the first anchor and the second anchor pass through the first slot and the second slot, respectively when the connector is at a first assembled position; and
   during the movement of the connector from the first assembled position to a second assembled position, the first anchor contacts a wall of the first slot of the vehicle part and the second anchor contacts a wall of the second slot of the vehicle part such that the second assembling hole is aligned with the first assembling hole.

9. The restraint assembly of the claim 8, wherein the first slot includes a first cutout and a second cutout, and a width of the second cutout is less than a width of the first cutout.

10. The restraint assembly of the claim 9, wherein the first anchor includes a first locking portion at an end thereof, and wherein the first locking portion includes a pair of locking wings positioned at two sides of the first anchor, respectively, and the first anchor is received in the second cutout, and an upper surface of the first locking portion is opposite to the second surface of the vehicle part.

11. The restraint assembly of the claim 9, wherein the upper surface of the first locking portion contacts the second surface of the vehicle part at the second assembled position.

12. The restraint assembly of the claim 9, wherein the second slot may be substantial a rectangular slot with a width direction being different from a width direction of the first slot.

13. The restraint assembly of the claim 12, wherein the second anchor includes a second locking portion at an end thereof and wherein the second anchor is received in the second slot at a first assembled position, and an upper surface of the second locking portion is opposite to the second surface of the vehicle part at the second assembled position.

14. The restraint assembly of the claim 13, wherein the upper surface of the second locking portion contacts the second surface at the second assembled position.

15. The restraint assembly of the claim 8, wherein the vehicle part is an A-pillar or a rear pillar of a vehicle.

16. The restraint assembly of the claim 8, wherein the base includes a first portion and a second portion extending from the first portion at an angle, the second assembling hole is positioned on the first portion, and the second portion includes a connecting hole to receive a tether of a side curtain airbag.

17. The restraint assembly of the claim 16, wherein the first side is at an end of the first portion opposite to the second portion, and the engagement of the first anchor with the vehicle part prevent the disengagement of the first anchor from the first slot during assembling process.

18. The restraint assembly of the claim 17, wherein the second anchor is positioned on the first portion and closer to the second portion relative to the first anchor.

19. A restraint assembly in a vehicle, comprising:
a vehicle part having a first surface and a second surface, a first assembling hole, a first slot and a second slot; a connector to attach a side curtain airbag to the vehicle part, the connector including:
a base including an assembling surface opposite to the first surface, a connecting hole to receive a tether of a side curtain airbag and a second assembling hole corresponding to the first assembling hole;
a first anchor positioned at a first side of the base opposite to the connecting hole; and
a second anchor positioned at a second side of the base, wherein the second side is adjacent to the first side;
wherein the first anchor and the second anchor correspond to the first slot and the second slot, respectively, the first and second anchors contact the first and second slots, respectively such that the first assembling hole aligns with the second assembling hole at an assembled position.

20. The restraint assembly of the claim 19, wherein the first anchor and the second anchor extend outwardly from the base and substantially perpendicular to the assembling surface, and wherein the first anchor includes a first locking portion, and the second anchor includes a second locking portion, wherein an upper surface of the first locking portion and an upper surface of the second locking portion contact the second surface of the vehicle part.

* * * * *